W. D. EWART.
LINKS FOR DRIVE CHAINS.

No. 188,113. Patented March 6, 1877.

Attest
W. S. Baker,
S. A. Bunting

Inventor
William D. Ewart
By Coburn & Thacher
Attorneys.

UNITED STATES PATENT OFFICE.

WILLIAM D. EWART, OF CHICAGO, ILLINOIS, ASSIGNOR TO EWART MANUFACTURING COMPANY, OF SAME PLACE.

IMPROVEMENT IN LINKS FOR DRIVE-CHAINS.

Specification forming part of Letters Patent No. 188,113, dated March 6, 1877; application filed May 27, 1876.

*To all whom it may concern:*

Be it known that I, WILLIAM D. EWART, of Chicago, in the county of Cook and State of Illinois, have invented a new and useful Improvement in Links for Drive-Chains, which is fully described in the following specification, reference being had to the accompanying drawings, in which—

Figure 1:
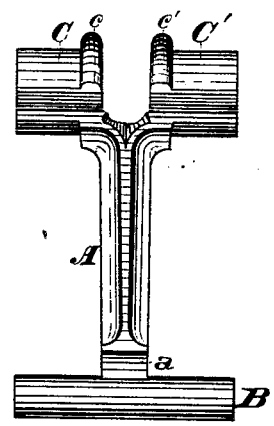
Figure 2:
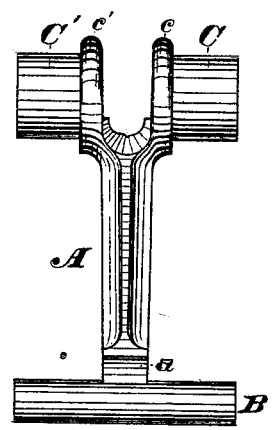
Figure 3:
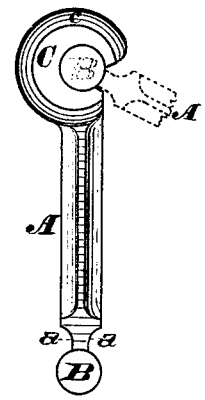
Figure 4:
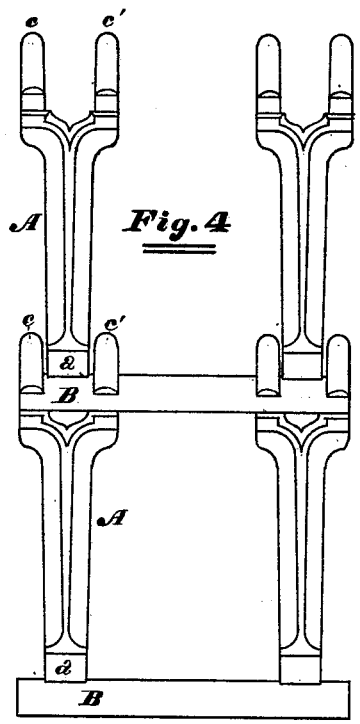

Figure 1 is a plan view of a bar-link with branching hook; Fig. 2, a plan view of the same, the other side up; Fig. 3, a side elevation, showing the coupling; Fig. 4, a plan view of open rectangular links with branching hooks; and Fig. 5 a plan view of links with three bars and branching hooks.

The object of my invention is to provide a coupling of such construction that single bar-links may be coupled directly to each other without the use of an intermediate piece.

The invention consists in making the link-bar with a divided or branching hook on one end, and a cross-bar or T-head on the other; and also in combining together bar-links of this construction, so as to form open rectangular links, with two, three, or more bars, as will be hereinafter fully described.

In the drawings, A represents a single bar, adapted for use as a link-bar, which may be constructed with fluted sides, or of any other form desired. The upper and lower sides of this bar are depressed at one end, as shown at $a\ a$ in Figs. 1 and 3 of the drawings, and upon this end of the bar is a round cross-head, B. Upon the other end of the bar is the coupling-hook, which has two branches, C and C', being centrally divided with an opening between the two branches sufficiently large to receive the link-bar A. The branches of the hook should project on each side of the bar, so as to be on a line with the ends of the cross-head. If desired, the branches of the hooks may be provided with ribs $c\ c'$, for the purpose of strengthening them, and also guiding the links upon the sprocket-wheels. The hooks are cast in permanent form, and in one piece, with the link-bar and cross-head. The links are coupled together by slipping the cross-head endwise into the hook, the link-bar being held in the position shown in Fig. 3 of the drawings, until it comes opposite the opening in the hook, when it should be turned down into said opening between the branches of the hook.

The single-bar link described above may be duplicated, so as to form a rectangular open link, with three sides inclosed. Links formed by duplicating the single-bar links in this manner are shown in Fig. 4 of the drawings, in which the cross-heads are cut short on one side of the link-bars A, but elongated on the other, so as to be united and form the end bar of the combined link. For some purposes, when large-sized links are required, this construction of link is very desirable.

Figure 5:
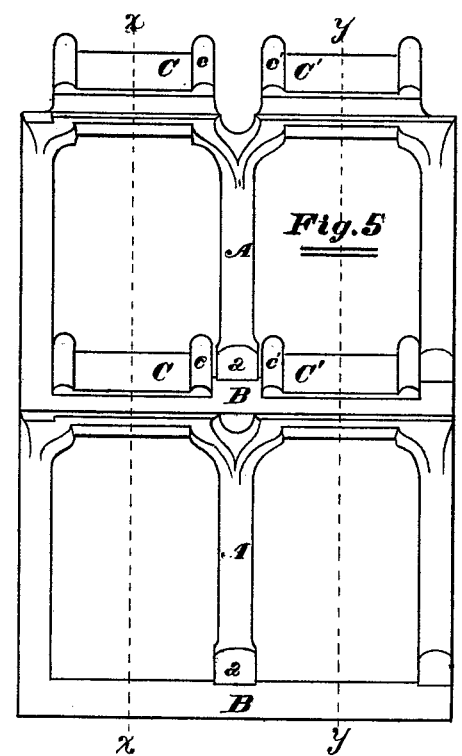

In Fig. 5 of the drawings, another method of combining the single-bar links is shown. In this construction, one single-bar link occupies a central position, and one-half of another similar link is joined to it upon each side thereof, the branches of the hooks and the sections of the cross-heads being brought together, so as to unite and form the hooks and end bars of the link, as seen in Fig. 5 of the drawings. The dotted lines $x\ x$ and $y\ y$ show the lines of union between the sections, as described above.

By this combination of the single-bar links a very strong three-bar link is formed, which is peculiarly adapted for use when links of very large size are required to sustain a severe strain. The middle bar A supports and strengthens the end bars of the link, so as to effectually prevent the bending or crippling of the side bars A.

I have shown only two forms of link obtained by combining the single-bar links, but it is evident that this system of building up from the unit shown in Fig. 1 of the drawings may be carried to any extent which is practicable. The modifications shown are sufficient to illustrate the method upon which the combination may be made.

I have shown and described the branching hook applied to a peculiar detachable coupling, heretofore patented by me, but I do not limit myself to this particular construction of hook and coupling-bar, for it is evident that the invention may be applied to hooks of various construction not adapted to be used with my patented coupling device without departing from the material feature of my invention, which is the division or branching of the coupling-hook.

Having thus described my invention, what I claim as new, and desire to secure by Letters Patent, is—

1. A link for drive-chains, having a divided or branching coupling-hook, C C', at one end, both branches projecting from the same central bar, and a suitable coupling-bar at the other end, substantially as described.

2. A single-bar link composed of the link-bar A, cross-head B, and branching hook C C', constructed and operating substantially as described.

3. A compound link for drive-chains composed of two or more single-bar links, constructed with branching hooks, as described, and united together, substantially as set forth.

WILLIAM D. EWART.

Witnesses:
L. A. BUNTING,
L. M. HARRIS.